(12) United States Patent
Khayrallah et al.

(10) Patent No.: US 7,460,583 B2
(45) Date of Patent: Dec. 2, 2008

(54) METHOD FOR PATH SEARCHING AND VERIFICATION

(75) Inventors: Ali S. Khayrallah, Cary, NC (US); Carmela Cozzo, Cary, NC (US); Gregory E. Bottomley, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 863 days.

(21) Appl. No.: 10/736,122

(22) Filed: Dec. 15, 2003

(65) Prior Publication Data

US 2005/0130616 A1 Jun. 16, 2005

(51) Int. Cl.
*H04B 1/00* (2006.01)

(52) U.S. Cl. ...................................... 375/148
(58) Field of Classification Search ............. 375/130, 375/140–153, 316, 346, 347, 349, 340, 341, 375/259–265, 267; 714/792, 795; 455/65, 455/63.1, 39, 500, 501, 504, 506
See application file for complete search history.

(56) References Cited

U.S. PATENT DOCUMENTS

| | | | | |
|---|---|---|---|---|
| 3,691,387 A * | 9/1972 | DeLange | ................... | 398/188 |
| 4,122,299 A * | 10/1978 | Cannon | ................... | 341/138 |
| 4,967,389 A * | 10/1990 | Omura et al. | ................ | 375/214 |
| 5,150,381 A * | 9/1992 | Forney et al. | ................ | 375/261 |
| 5,291,499 A * | 3/1994 | Behrens et al. | ............. | 714/796 |
| 5,430,744 A * | 7/1995 | Fettweis et al. | ............ | 714/795 |
| 5,642,153 A * | 6/1997 | Chaney et al. | ................ | 725/40 |
| 5,757,855 A * | 5/1998 | Strolle et al. | ................ | 375/262 |
| 5,905,742 A * | 5/1999 | Chennakeshu et al. | ...... | 714/792 |
| 5,974,080 A | 10/1999 | Papasakellariou | | |
| 6,339,624 B1 * | 1/2002 | Ohlson | ....................... | 375/341 |
| 6,694,444 B1 * | 2/2004 | Mandal | ....................... | 713/400 |
| 6,757,345 B1 * | 6/2004 | Heinila | ....................... | 375/349 |
| 2002/0015401 A1 * | 2/2002 | Subramanian et al. | ...... | 370/347 |
| 2003/0013457 A1 | 1/2003 | Amerga et al. | | |

OTHER PUBLICATIONS

Ungerboeck, "Channel Coding with Multilevel/Phase Signals", IEEE Transcations on Information Theory, vol. IT-28, No. 1, Jan. 1982.*

(Continued)

*Primary Examiner*—Mohammad Ghayour
*Assistant Examiner*—Vineeta S Panwalkar
(74) *Attorney, Agent, or Firm*—Coats & Bennett P.L.L.C.

(57) ABSTRACT

The present application describes a new path search and verification method and apparatus for identifying and selecting one or more delays for a receiver. A front-end receiver receives a signal having one or more signal images, where each signal image has a corresponding signal delay. A tree generator builds a hierarchical delay tree from a plurality of delay nodes, each corresponding to one of the signal delays. A tree searcher searches through the delay tree to identify one or more surviving delay nodes, where each surviving delay node corresponds to a candidate delay for the receiver. The receiver may also include a state machine comprising a plurality of ordered states for providing candidate delays for the receiver. The state machine stores the candidate delays and shifts the candidate delays between states within the state machine based on the latest results from the tree searcher.

102 Claims, 12 Drawing Sheets

OTHER PUBLICATIONS

Khayrallah, A, Cozzo, C., and Bottomley, G., "Method and Apparatus for Finger Placement in a RAKE Receiver," U.S. Appl. No. 10/653,679, filed Sep. 2, 2003.

Affes, S. and Mermelstein, P.; "A New Receiver Structure for Asynchronous CDMA: STAR—The Spatio-Temporal Array-Receiver," *IEEE Transactions on Selected Areas in Communications*, vol. 16, No. 8, Oct. 1998, pp. 1411-1422.

Lee, Seongjoo and Kim, Jaeseok, "Performance Analysis of DS-SS PN Code Acquisition Systems Using Soft-Decision Techniques in a Rayleigh-Fading Channel," IEEE Transactions on Vehicular Technology, vol. 51, No. 6, Nov. 2002, pp. 1587-1595.

\* cited by examiner

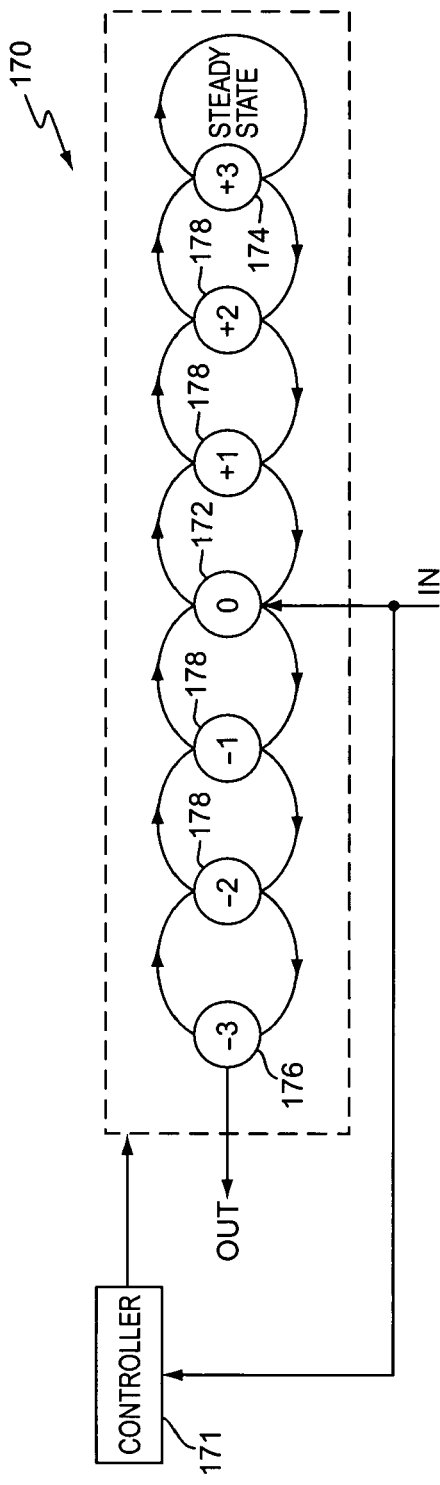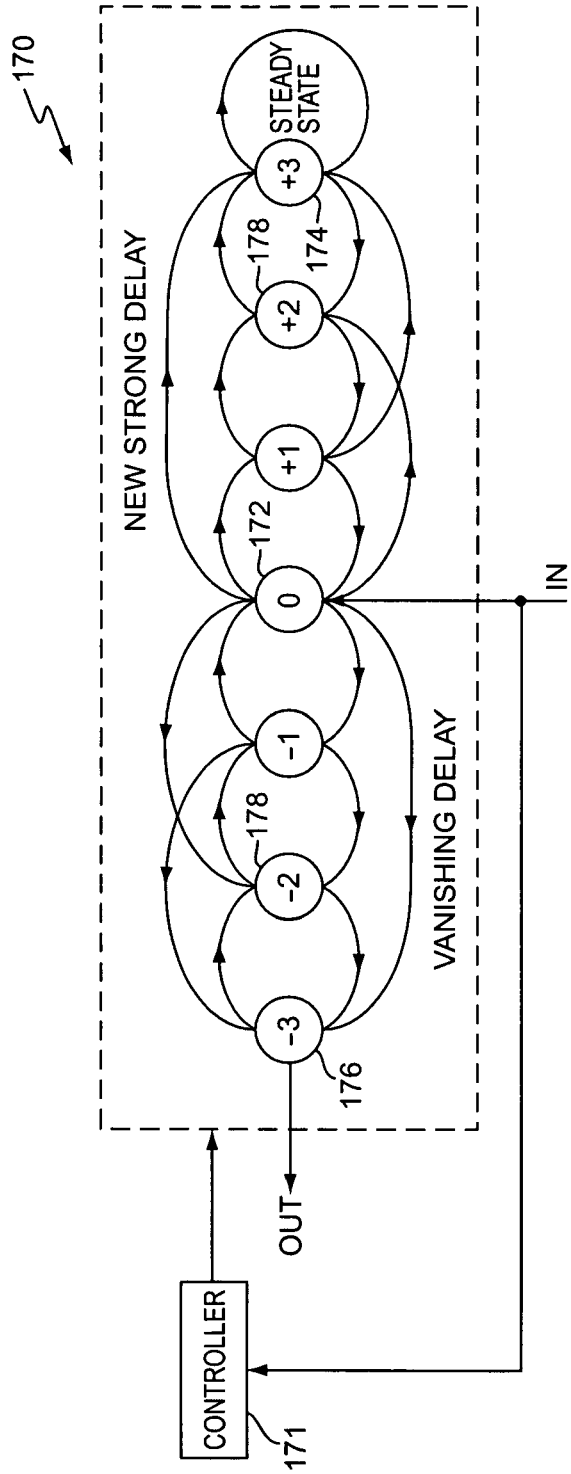
FIG. 6A
FIG. 6B

METHOD FOR PATH SEARCHING AND VERIFICATION

BACKGROUND OF THE INVENTION

The present invention relates generally to receivers, and more specifically to delay searchers for selecting candidate delays for the receiver.

Wireless signals often travel multiple propagation paths between a transmitter and an intended receiver. As such, the intended receiver receives a composite signal that typically includes multiple images of a transmitted signal, where each image generally experiences different path delay, phase, and attenuation effects. Different signal images therefore arrive at the receiver at different times, causing a delay spread between the received signal images. The maximum delay spread between signal images depends on, among other things, the differing characteristics of the signal propagation paths.

Because the signal energy is distributed among the multiple signal images, conventional wireless receivers often include one or more RAKE receivers, particularly in Code Division Multiple Access (CDMA) systems, such as IS-95, Wideband CDMA (WCDMA), and cdma2000 systems, to improve the signal-to-noise ratio (SNR) by combining the received signal images. RAKE receivers include a plurality of RAKE fingers tuned to different delays to despread signal images. Typically, the RAKE receiver tunes its available RAKE fingers to the strongest signal images, such that each selected signal image is despread and subsequently combined with the other selected and despread signal images. Combining multiple signal images in this manner generally improves the SNR of the received signal.

To support the despreading and combining operations, RAKE receivers include, or otherwise cooperate with, a path searcher that identifies one or more signal energies in a received signal across a defined search window. Conventional path searchers generate a signal energy vs. delay profile and search through the profile to identify candidate delays. In some systems, the path searcher may use peak detection to identify the candidate delays.

Other systems may overlay a grid onto the signal energy vs. delay profile and compare the signal energy at each grid point to a threshold. The grid points with signal energies that meet or exceed the threshold are selected as candidate delays. In either of these cases, the candidate delays are available to the RAKE receiver for assignment to the RAKE fingers.

Because channel parameters normally change over time, the path searcher may continue to monitor the received signal to track current RAKE finger delays and to search for new candidate delays. Further, because reassigning a RAKE finger necessarily requires that the reassigned RAKE finger be disabled for a period of time, the path searcher may also perform a verification function to prevent unnecessary reassignment of RAKE fingers. In general, the verification function evaluates the candidate delays over time to verify that a new candidate delay has been found, that a current RAKE finger delay is no longer present in the received signal, and/or that a current RAKE finger delay is still present in the received signal.

There are several approaches for implementing a verification function in a RAKE receiver. One conventional approach simply averages a signal energy level corresponding to a certain delay over multiple measurements, i.e., by using a linear average, an exponential average, or other forms of low pass filtering. If the averaged signal energy level meets or exceeds a threshold, the path searcher verifies the corresponding delay as a viable RAKE finger delay.

Other conventional methods compare multiple measurements of a signal energy level corresponding to a certain delay to a threshold, as shown in "A New Receiver for Asynchronous CDMA: STAR—the Spatio-Temporal Array Receiver," published in IEEE J-SAC, vol. 16, no. 8, pp. 1411-1422, October 1998, or compare a fraction of consecutive signal energy level measurements at a certain delay to a threshold, as shown in "Performance Analysis of DS-SS PN Code Acquisition Systems Using Soft Decision Techniques in a Rayleigh-fading Channel," published in IEEE T-VT, vol. 51, no. 6, pp. 1587-1595, November 2002, both of which are incorporated herein by reference. In any event, the object of the verification function is (1) to prevent unnecessary reassignment of the RAKE fingers, and (2) to enable the discovery of new paths.

SUMMARY OF THE INVENTION

The present invention describes a new path search and verification method and apparatus for identifying signal images in a receiver. For example, signal images may be identified for assignment to one or more RAKE fingers in a RAKE receiver. An exemplary receiver according to the present invention comprises a front-end receiver and a delay searcher. The front-end receiver receives a signal having one or more signal images, where each signal image has a corresponding signal delay. The delay searcher searches through a hierarchical delay tree to identify one or more surviving delay nodes, where each surviving delay node corresponds to a candidate delay for, e.g., a RAKE finger in the RAKE receiver.

The delay searcher may include a tree generator and a tree searcher. The tree generator builds the hierarchical delay tree from a plurality of delay nodes, where each delay node corresponds to one of the signal delays. In general, the tree generator generates one or more linking nodes from the delay nodes and uses branches to link the plurality of delay nodes to a root node via the linking nodes. The tree searcher searches through the delay tree to identify the surviving delay nodes.

Exemplary embodiments of the receiver may also comprise a state machine that includes a plurality of ordered states, including a start state, a steady state, and an exit state. A controller promotes or demotes candidate delays within the state machine based on the results of a subsequent search through the delay tree. For example, the controller may promote a candidate delay that corresponds to a surviving delay node in a subsequent search through the delay tree. The receiver then selects one or more candidate delays from the steady state of the state machine.

An exemplary method for selecting one or more finger delays for a receiver according to the present invention includes generating a hierarchical delay tree from the plurality of delay nodes and searching through the delay tree to identify one or more surviving delay nodes corresponding to the one or more candidate delays. The method further comprises adding the candidate delays to a candidate pool and selecting one or more signal delays from the candidate pool.

In an exemplary embodiment, the candidate pool is a state machine with a plurality of ordered states including a start state, a steady state, and an exit state. According to this embodiment, the method further includes promoting the candidate delays from a first state to a second state when the corresponding signal delay node survives subsequent searches and selecting one or more candidate delays from the steady state.

BRIEF DESCRIPTION OF THE DRAWINGS

FIGS. 6A-6B illustrate exemplary state machines according to the present invention.

DETAILED DESCRIPTION OF THE INVENTION

The present invention is described herein in the context of a CDMA cellular communication system. While the present invention may be particularly useful for improving the performance of CDMA cellular networks, it should be understood that the principles of the present invention may be applied to any cellular or wireless system utilizing other air interfaces, such as Time Division Multiple Access (TDMA), Global System for Mobile communications (GSM), WCDMA, IS-95, IS-2000, Orthogonal Frequency Division Multiplexing (OFDM) based systems, or Frequency Division Multiple Access (FDMA) systems. For example, the present invention may be used to generate delay estimates for demodulating (equalizing) GSM/Enhanced Data Rates for Global Evolution (EDGE) signals. (It is known how delay estimates may be used to demodulate a GSM/EDGE signal.) It should further be understood that the principles of the present invention may be utilized in hybrid systems that are combinations of two or more of the above air interfaces.

Figure 1:
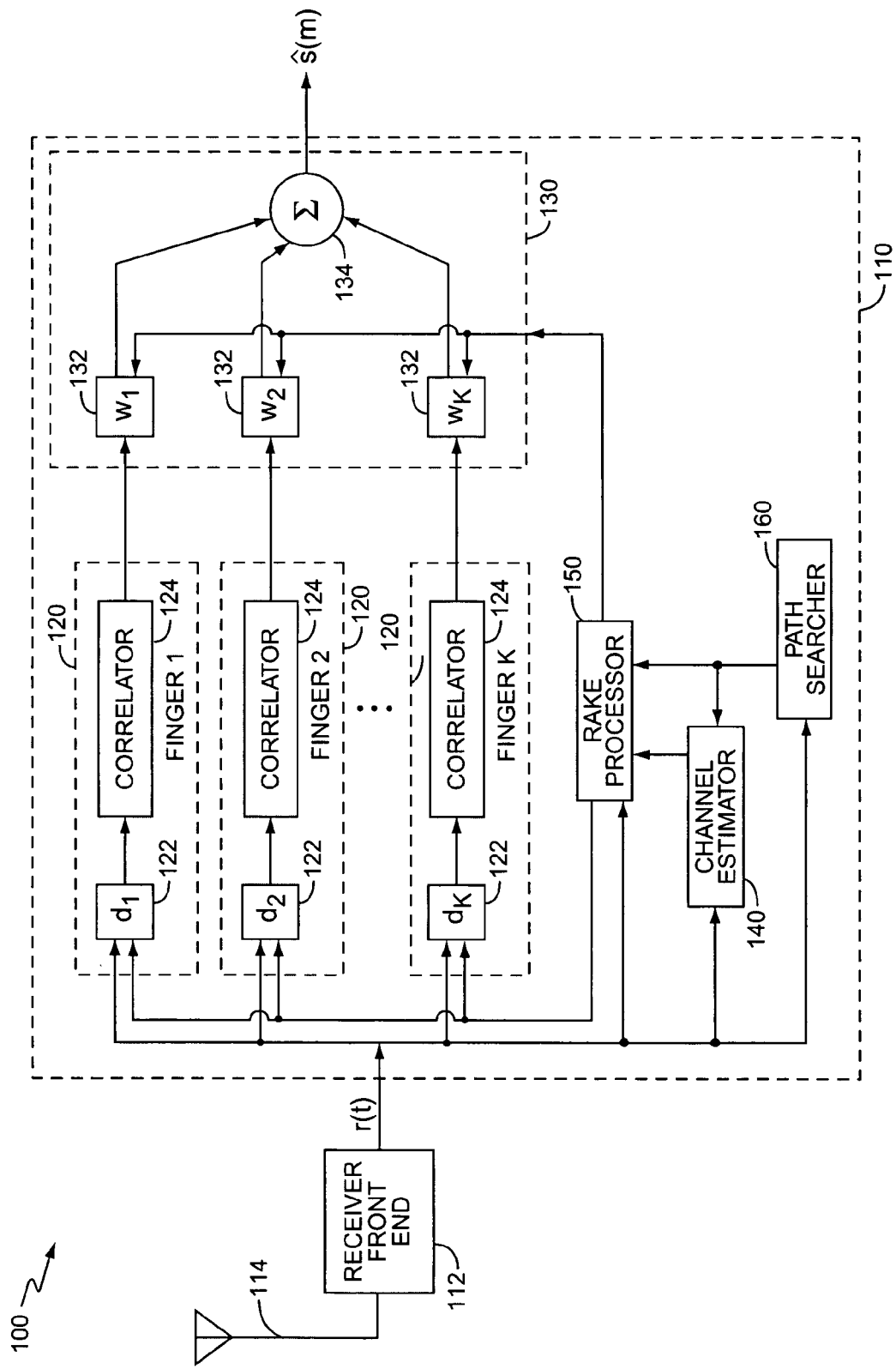
FIG. 1 illustrates a block diagram of an exemplary wireless receiver according to the present invention.

FIG. 1 illustrates an exemplary block diagram of a wireless receiver, generally indicated by reference number 100, in a cellular communication system according to the present invention. Wireless receiver 100 may be embodied in any wireless device, such as a base station or a mobile terminal. As used herein, the term "mobile terminal" may include a cellular radiotelephone with or without a multi-line display; a Personal Communication System (PCS) terminal that may combine a cellular radiotelephone with data processing, facsimile, and data communications capabilities; a Personal Digital Assistant (PDA) that can include a radiotelephone, pager, Internet/intranet access, web browser, organizer, calendar, and/or a global positioning system (GPS) receiver; and a conventional laptop and/or palmtop receiver or other appliance that includes a radiotelephone transceiver. Mobile terminals may also be referred to as "pervasive computing" devices.

Referring to FIG. 1, wireless receiver 100 includes a RAKE receiver 110, a receiver front end 112, and an antenna 114. Receiver front end 112 outputs received signals r(t) to RAKE receiver 1 10. The received signals r(t) comprise streams of sample values obtained from wireless signals received by one or more antennas 114 associated with one or more receiver front ends 112. An exemplary front end 112 may include amplifiers, filters, mixers, digitizers, and/or other electronics as needed to produce a sampled signal suitable for processing by the RAKE receiver 110. In some embodiments, the received signal r(t) may also include components transmitted from different antennas (not shown).

Each received signal r(t) typically includes one or more signal images arising from multi-path propagation. These signal images arrive at the receiver 100 from different directions and with different time delays. The task of the RAKE receiver 110 is to combine the signal images to generate an estimate ŝ(m) of each transmitted symbol s(m) from the received signal r(t). To that end, RAKE receiver 110 delays, despreads, weights, and combines the received signal as discussed further below. While the present invention is described in terms of a RAKE receiver 110, those skilled in the art will appreciate that the present invention also applies to G-RAKE receivers, multi-user detection receivers, chip equalizers, and any other form of demodulator that identifies time-aligned signal images corresponding to a transmitted signal.

RAKE receiver 110 comprises a plurality of RAKE fingers 120, a RAKE combiner 130, a channel estimator 140, a RAKE processor 150, and a path searcher 160. Each RAKE finger 120 processes a different signal image of the received signal r(t). Typically, each RAKE finger 120 includes a delay element 122 and a correlator 124. Delay elements 122 delay the composite signal r(t) by an amount defined by RAKE processor 150 to time align the signal images processed by each RAKE finger 120. Correlators 124 correlate the delayed signals with a spreading code to extract the signal images from the received signal r(t). Despread values from correlators 124 are combined in RAKE combiner 130.

RAKE combiner 130 includes weighting elements 132 and summer 134. Weighting elements 132 receive and weight the despread signals from RAKE fingers 120 by weighting coefficients $w_1, w_2, \ldots w_K$ determined by RAKE processor 150, as described further below. Summer 134 then sums the weighted despread signals symbol-by-symbol to form a symbol estimate ŝ(m) during each symbol period.

The delays assigned to each RAKE finger 120 and the corresponding weighting coefficients are determined by RAKE processor 150 in coordination with channel estimator 140 and path searcher 160. As known by those skilled in the art, channel estimator 140 estimates the channel and provides estimated channel coefficients to RAKE processor 150. Path searcher 160 identifies candidate delays to be assigned to the RAKE fingers 120, as described further below. RAKE processor 150 uses the input signal r(t), the channel estimates provided by the channel estimator 140, and candidate delays provided by path searcher 160 to identify and assign the appropriate delays and weighting coefficients to the RAKE fingers 120 and RAKE combiner 130, respectively.

Figure 2:
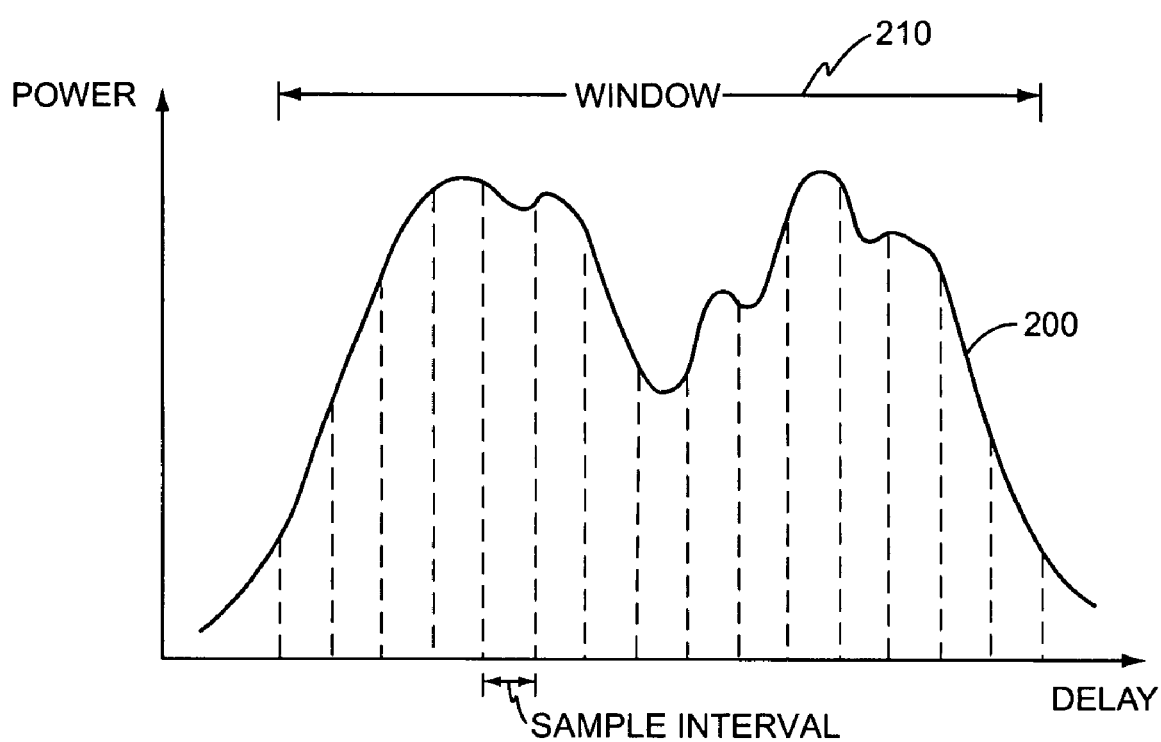
FIG. 2 illustrates an exemplary power versus delay plot of a received signal over a search window.

FIG. 2 illustrates an exemplary power versus delay profile (PDP) of a received signal r(t), which will help in understanding the operation of the path searcher 160. As shown in FIG. 2, the PDP is sampled (measured) at a defined sample interval. While FIG. 2 shows a uniform sampling interval, it will be appreciated that the present invention may also use a non-uniform sampling interval to obtain the PDP samples. Each sample interval represents a different delay. The path searcher 160 defines a search window, measures the energy of the received signal at each sample interval in the search window, and selects the candidate delays based on the measured energy. For convenience, the search window may use a fixed grid of size $2^n$ sample intervals. The sampling interval may correspond to Nyquist spacing or less. For example, in WCDMA systems, the Nyquist spacing is approximately 0.82 chip, meaning that a sampling interval larger than this may result in a loss of information. Practical sampling intervals include 1 chip (resulting in a slight loss), 0.75 chip, and 0.5 chip periods.

Figure 3:
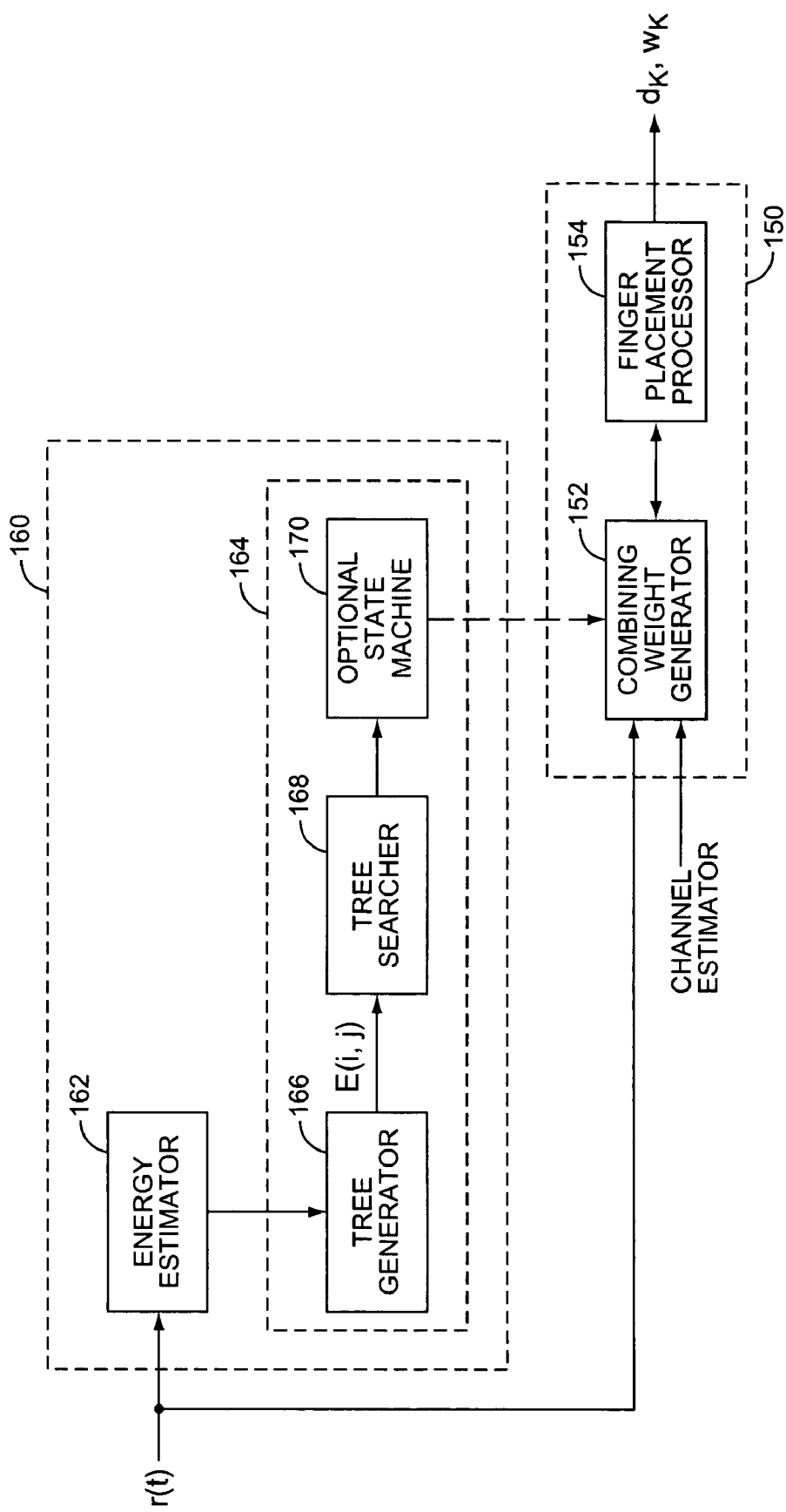
FIG. 3 illustrates a block diagram of an exemplary path searcher and RAKE processor according to the present invention.

FIG. 3 illustrates further details of an exemplary RAKE processor 150 and path searcher 160 according to one exemplary embodiment of the invention. Path searcher 160 includes an energy estimator 162 and a delay searcher 164. Energy estimator 162 estimates the energy levels, such as the power of the received signal (with or without the noise floor). The energy estimates determined by energy estimator 162 are provided to delay searcher 164. Delay searcher 164 searches through the estimated signal energies to identify candidate signal delays for the RAKE receiver 110. In the exemplary embodiment, the delay searcher uses a hierarchical tree to facilitate the search for candidate delays.

FIG. 4 illustrates a binary delay tree 300 used by delay searcher 164 to identify candidate delays in the exemplary embodiment. Binary delay tree 300 comprises a root node 302 connected to a plurality of delay nodes 304 via branches 305 that interconnect a plurality of linking nodes 306. Each node 302, 304, 306 is assigned an energy value denoted E(i,j), where i is an index denoting a level in the tree 300 and j is an index denoting a node within a level. Those skilled in the art will appreciate that each j corresponds to a slice of the search window, which gets progressively larger at successively higher levels of the tree 300. Each delay node 304 corresponds to a sampling interval and is assigned an energy value equal to the measured energy of the corresponding sampling interval. Their sum is equal to the total measured energy in the search window. Each node 302, 306 above the delay nodes 304 has an energy value equal to the sum of two child nodes and may be computed according to:

$$E(i,j)=E(i+1,2j-1)+E(i+1,2j) \qquad \text{(Eq. 1)}$$

The delay tree 300 is thus constructed by working upward from the delay nodes 304 and summing pairs of adjacent nodes until reaching the root node 302. For any linking node 306, the energy value E(i, j) is equal to the sum of the energy values of the delay nodes 304 below that linking node 306. The root node 302 has an energy value equal to the total measured energy for all delay nodes 306.

The delay tree 300 indicates the location of the signal energies within the search window 210. For example, E(1,1) indicates the total energy located in the left half of search window 210, while E(2,4) indicates the total energy located in the right quarter of search window 210. This characteristic of delay tree 300 can be exploited, as discussed further below, to simplify the search process of delay searcher 164.

Referring back to FIG. 3, delay searcher 164 comprises a tree generator 166, a tree searcher 168, and optionally, a state machine 170. The tree generator 166 generates a hierarchical delay tree 300, such as that shown in FIG. 4. The tree searcher 168 searches through the delay tree to identify candidate delays. The candidate delays may then be input to the state machine 170, which maintains and ranks the candidate delays pending assignment to one of the RAKE fingers.

In an exemplary embodiment, tree searcher 168 uses level dependent thresholds to simplify the search through the delay tree 300. Such level dependent thresholds may, for example, represent a fraction of the total energy contained within the search window. In an exemplary embodiment, the level dependent thresholds, T(i), may be calculated for each level of the delay tree 300 according to:

$$T(i)=(1-\epsilon)2^{-i}E, \qquad \text{(Eq. 2)}$$

where E represents the total received signal energy within the search window 210 and $\epsilon$ represents a tunable parameter calculated according to Equation 3:

$$\epsilon = \frac{E - 2^i F}{E}. \qquad \text{(Eq. 3)}$$

The tunable parameter of Equation 3 represents a ratio of the estimated total signal energy, $E-2^i F$ to the total received energy, E, within the search window, where F denotes the average noise energy per sample. The threshold equations shown above describe only one way to calculate level dependent thresholds for tree searcher 168 of the present invention. Those skilled in the art will appreciate that other level dependent thresholds may be used with the present invention.

Tree searcher 168 searches delay tree 300 by traversing downward through the delay tree 300 and comparing the energy E(i, j) of each node at level i to the threshold T(i). The search may begin one level below the root level, or at some lower level. In general, each node at level i that meets or exceeds T(i), represents a surviving node, while each node with energy levels less than T(i) represents a non-surviving node. Typically, at least one node 304, 306 at each level will survive. However, it will be appreciated that multiple nodes 304, 306 at each level may survive.

As tree searcher 168 traverses downward through the delay tree 300, only the nodes 304, 306 that branch from surviving nodes are compared to the threshold T(i); the non-surviving nodes and all nodes 304, 306 that branch from non-surviving nodes are pruned from delay tree 300. This process continues until the entire delay tree 300 is traversed and M surviving delay nodes 304 are identified. The delays corresponding to surviving delay nodes represent candidate delays for RAKE receiver 110 and are input to the state machine 170.

Figure 4A:
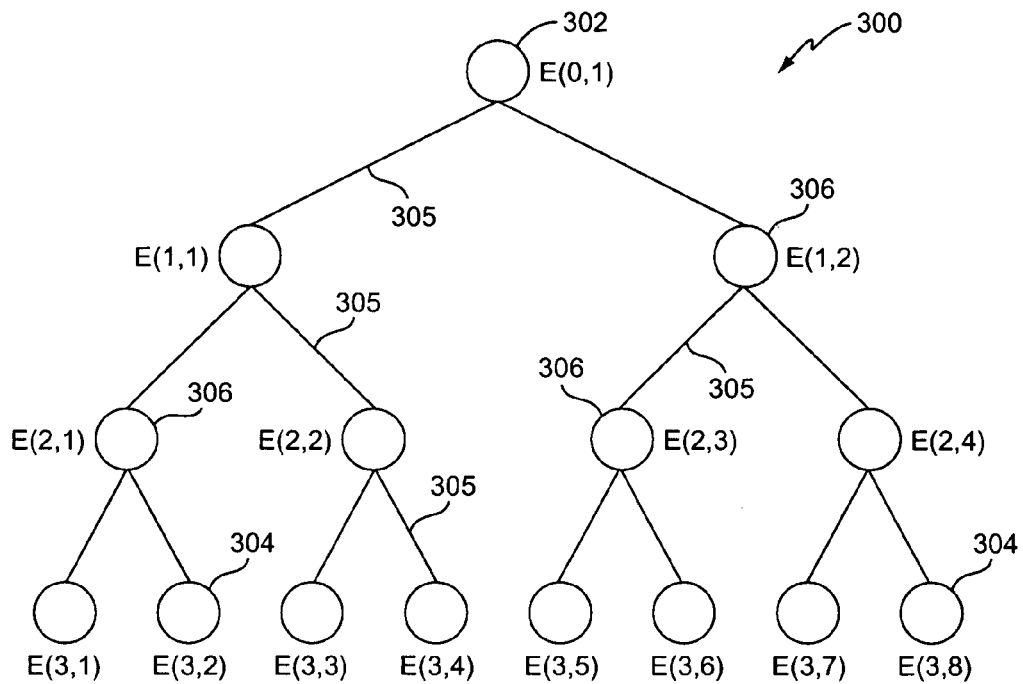
FIGS. 4A-4C illustrate an exemplary delay tree according to the present invention.
Figure 4B:
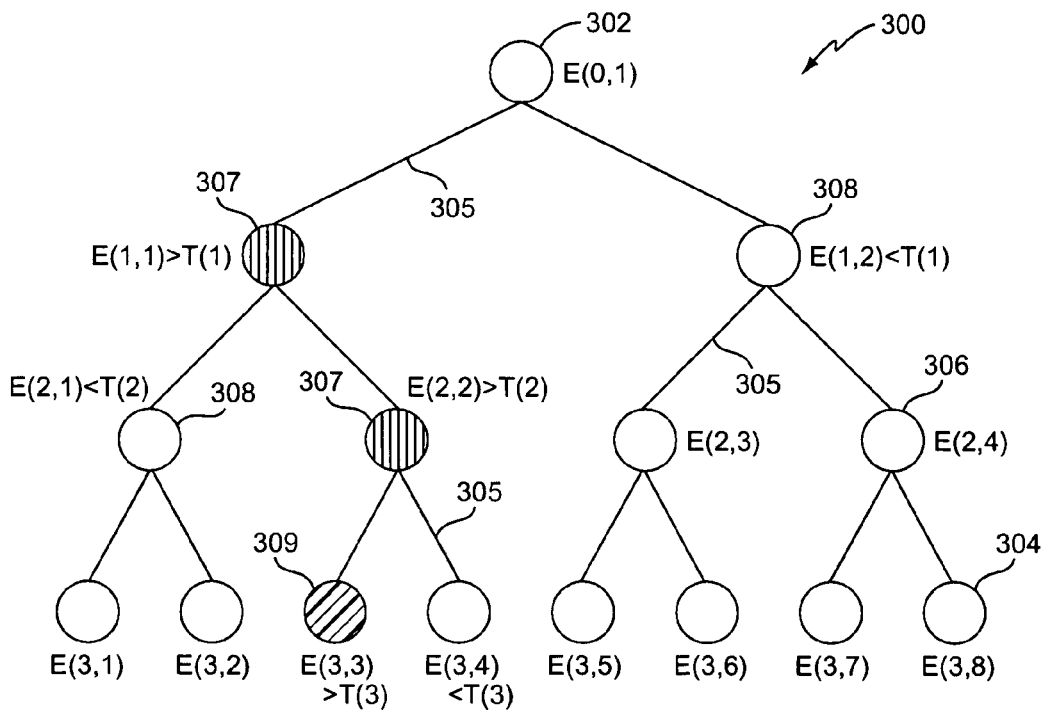

FIG. 4B illustrates an exemplary traversal through delay tree 300. As illustrated in FIG. 4B, E(1,1) and E(2,2) represent surviving nodes 307 because E(1,1)>T(1) and E(2,2)>T(2). Further, because E(1,2)<T(1) and E(2,1)<T(2), E(1,2) and E(2,1) represent non-surviving nodes 308; E(1,2) and E(2,1) and all nodes that branch therefrom are pruned from delay tree 300 to prevent further unnecessary threshold comparisons at the lower levels of delay tree 300. In the last level (level three) of the delay tree 300, only E(3,3) and E(3,4) are compared to T(3) because these are the only nodes in level three that branch from a surviving node 307. Because only E(3,3)>T(3), only E(3,3) survives and becomes a surviving delay node 309. As a result, the delay associated with E(3,3) represents a candidate delay for the RAKE receiver 110.

In FIGS. 4A and 4B, the total number of delay nodes 304 (eight) is a power of two.

Figure 4C:
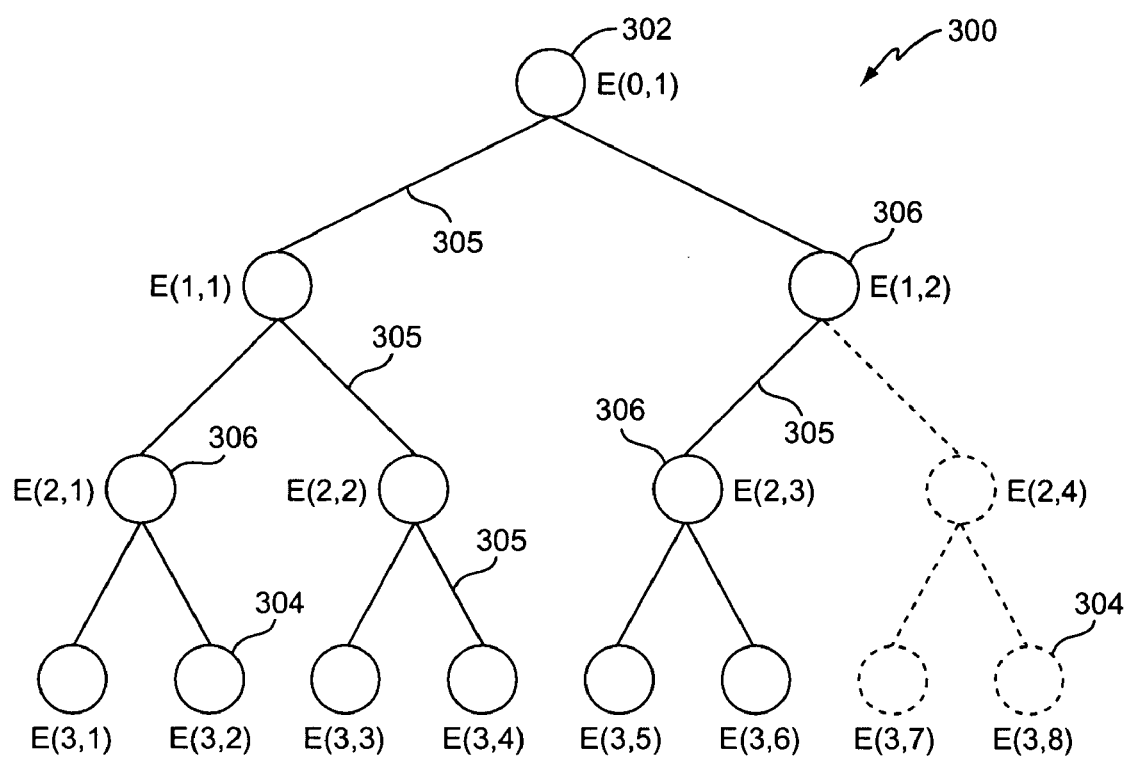

If the number of delay nodes 304 is not a power of two, the invention works as shown in FIG. 4C. In FIG. 4C, there are only six delay nodes. However, we can think of there being an additional two virtual delay nodes 304, shown in dotted lines. At the start, we add pairs of energy values associated with the six delay nodes, giving us three linking nodes 306. Next the energies associated with the first two linking nodes, E(2,1) and E(2,2), are added to generate a new linking node E(1,1). Normally, the energies of the third and fourth linking nodes, E(2,3) and E(2,4) would be added to generate another new linking node E(1,2). However, as shown in FIG. 4C, the fourth linking node is missing. To compensate for the missing linking node 306, a copy of the third linking node E(2,3) is treated as the fourth linking node E(2,4). The energies associated with the third linking node E(2,3) and the virtual linking node E(2,4) are then added to obtain the new linking node E(1,2). Thus, in this scenario, E(1,2) is simply twice E(2,3). In general, when any layer of the delay tree 300 has an odd number of nodes, a new linking node 306 is generated at the next layer by simply doubling the energy of the odd node.

Tree searcher 168 of the present invention typically identifies M surviving delay nodes, and therefore identifies M candidate delays. However, in some situations, tree searcher 168 may determine that M is too small or too big. To address these situations, in some embodiments of the present invention tree searcher 168 may perform multiple searches of the same delay tree 300 using different level dependent thresholds. For example, when M is deemed to be too small, tree searcher 168 may calculate a new threshold, T'(i), by calculating a new tunable parameter $\epsilon' = \epsilon + \Delta\epsilon$, where $\Delta\epsilon$ is a small increment. The new threshold is therefore, $$T'(i) = (1-\epsilon')2^{-i}E < T(i) \quad \text{(Eq. 4)}$$

Because T'(i)<T(i), all nodes 304, 306 that survived the first search will also survive the second search. Therefore, only the non-surviving nodes 308 need to be searched in the second search. As with the first search, the tree searcher 168 traverses downward through the delay tree 300. At each level, the tree searcher 168 compares all previously identified non-surviving nodes 308 to T'(i) and skips all previously identified surviving nodes 307, 309. The second search provides M'>M surviving delay nodes 304 that correspond to M' candidate delays. If M' is still too small, the search may be repeated any number of times until the desired number of candidate delays is identified.

Similarly, when M is deemed to be too large, tree searcher 168 may calculate a new threshold, T'(i), by calculating a new tunable parameter $\epsilon' = \epsilon - \Delta\epsilon$. The new thresholds are therefore, $$T'(i) = (1-\epsilon')2^{-i}E > T(i) \quad \text{(Eq. 4)}$$

Because T'(i)>T(i), all nodes 304, 306 that did not survive the first search will also not survive the second search. Therefore, only the surviving nodes 308 need to be examined in the second search. In the second search of the delay tree 300, the tree searcher 300 traverses downward through the delay tree 300 and compares all previously identified surviving nodes 307, 309 to T'(i) while skipping all previously identified non-surviving nodes 308. The second traversal provides M'<M surviving delay nodes that correspond to M' candidate delays. If M' is still too large, the search may be repeated any number of times until the desired number of candidate delays are identified.

Figure 5:
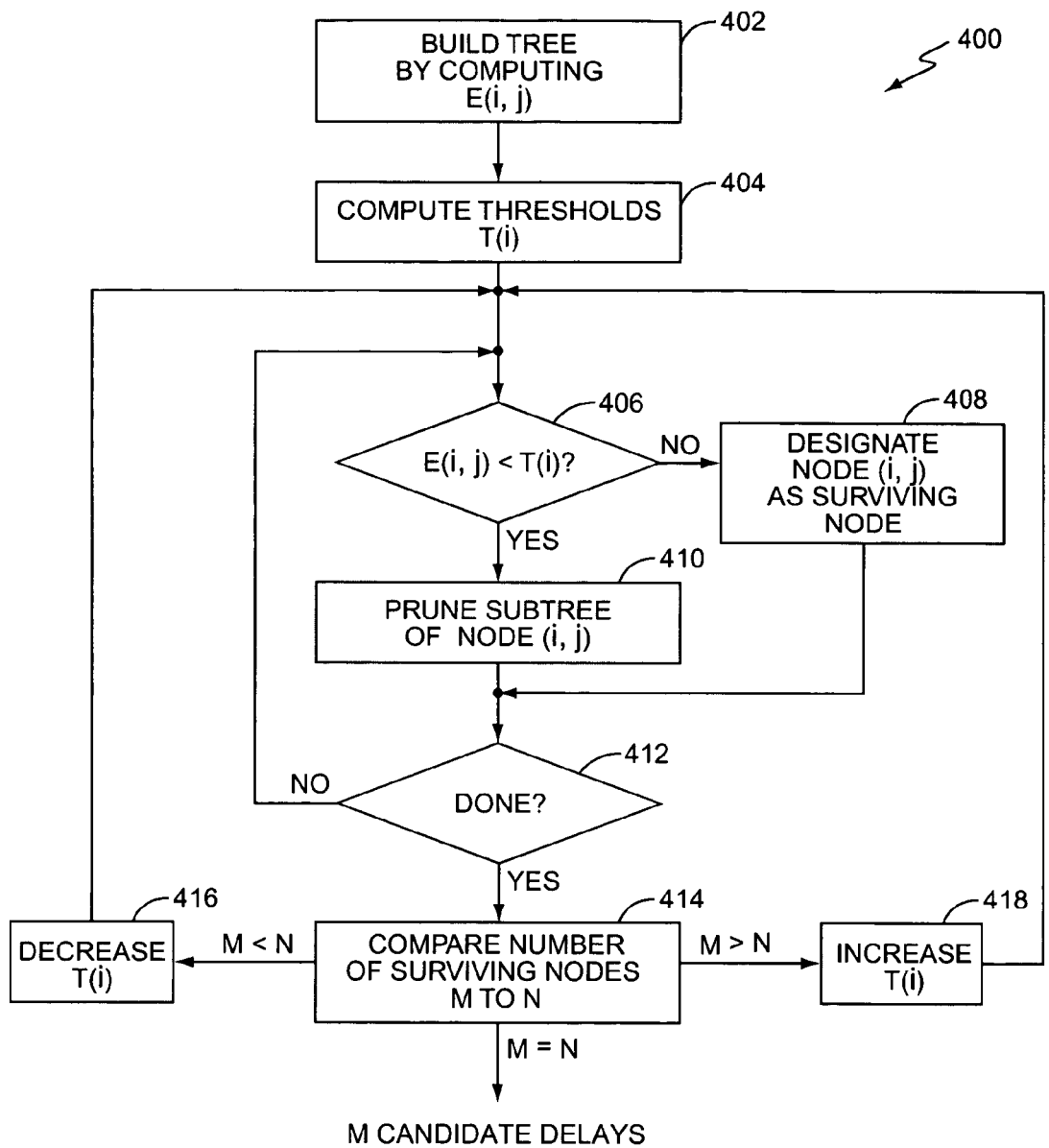
FIG. 5 illustrates an exemplary path search process according to the present invention.

FIG. 5 is a flow chart illustrating an exemplary search procedure implemented by path searcher 160. This procedure may be executed once every symbol period, or at some other desired interval. Tree generator 166 computes energy values E(i,j) based on measurements from energy estimator 162 and builds the delay tree 300 (Block 402). Delay searcher 164 computes the level dependent threshold T(i) (Block 404) and searches the delay tree 300 as previously described. As the delay searcher 168 traverse through the delay tree 300, it identifies one or more surviving nodes at each level by comparing the energy value to the corresponding threshold for that level (Block 406). When the energy value E(i,j)<T(i), the corresponding node is designated as a non-surviving node and the subtree below the corresponding node is pruned (Block 410). The subtree from the non-surviving node is not included in subsequent searching. When E(i,j)>T(i), the node corresponding to E(i,j) is designated as a surviving node (Block 408) and the search for candidate delays below the surviving node continues. Tree searcher 168 repeats this process until the entire delay tree 300 has been traversed and M surviving delay nodes 309 corresponding to M candidate delays have been identified (Block 412).

After the first search is complete, tree searcher 168 compares the number of candidate delays, M, to the desired number of candidate delays, N (Block 414). If M is too small, tree searcher 168 decreases T(i) (Block 416), and repeats the search (Blocks, 406-412), skipping all previously identified surviving nodes 307, 309, as described above. If M is too large, delay searcher 164 increases T(i) (Block 418), and repeats the search (Blocks, 406-412), skipping all previously identified non-surviving nodes 308, as described above. This process is repeated until the desired number of candidate delays has been identified. Alternatively, when M is too large, the N candidate delays corresponding to the M strongest energy values are kept.

The tree searching process requires fewer comparisons than conventional search methods. Using the example shown in FIG. 4B to illustrate, conventional methods would typically require eight comparisons to identify the candidate delay corresponding to surviving delay node 309. The present invention significantly reduces this number of comparisons by only using three comparisons to identify the surviving delay node 309. Thus, the present invention is less computationally complex than traditional search methods. The candidate delays identified by tree searcher 168 are optionally input to the state machine 170. State machine 170 stores the candidate delays for RAKE receiver 110 and shifts the candidate delays between states within the state machine 170 based on latest results from the tree searcher 168. The candidate delays stored within the state machine 170 represent the pool of delays eligible to be assigned to RAKE fingers 120. If a state machine 170 is not used, the RAKE processor 150 would receive the results output from the tree searcher 168 and assign delays to the RAKE fingers 120 based on the results.

FIG. 6 illustrates an exemplary state machine 170 with a plurality of ordered states, including a start state 172, a steady state 174, an exit state 176, and one or more intermediate states 178. Other configurations of the state machine 170 may be used including any number of states from two and up. Further, note that the same state may serve multiple purposes. For example, the start state and the steady state may be the same state. State machine 170 may also comprise a state controller 171 that provides control signals to indicate candidate delays that are to be added to or deleted from the state machine 170, and to indicate candidate delays that are promoted or demoted as described below.

New candidate delays identified by the tree searcher 168 enter the state machine 170 at the start state 172. A new candidate delay is one that is not already present in the state machine 170. Once in the state machine 170, candidate delays are promoted or demoted according to the output of the tree searcher 168. If a surviving delay node 309 identified by the tree searcher 168 corresponds to a candidate delay already present in the state machine 170, the existing candidate delay is promoted to a higher state unless the candidate delay has already been promoted to the steady state 174. When a candidate delay in the steady state 174 is "promoted," the state machine 170 holds the candidate delay within steady state 174. Similarly, if a non-surviving delay node identified by the tree searcher 168 corresponds to a candidate delay already present in the state machine 170, the candidate delay is demoted to a lower state. When a non-surviving delay node corresponds to a candidate delay in the exit state 176, the candidate delay exits the state machine 170 and is no longer available to the RAKE receiver 110.

While FIG. 6A illustrates a state machine 170 that promotes and demotes candidate delays to adjacent states, the present invention is not so limited. State machines 170 may promote or demote candidate delays according to any desired pattern based on the states of the delay nodes in subsequent tree searches. For example, FIG. 6B illustrates an alternate state machines 170 according to the present invention. The state machine 170 of FIG. 6B allows strong candidate delays to bypass one or more intermediate states 178 to expedite the process of reaching the steady state 174, or rapidly vanishing delays to bypass one or more intermediate states to reach the exit state 176. As shown in FIG. 6B, candidate delays that correspond to surviving or non-surviving delay nodes with large increases or decreases in signal strength may skip one or more intermediate states 178 when being promoted or demoted, respectively. The number of intermediate states 178 that are skipped may depend on the magnitude of the change in signal strength. A candidate delay identified as a strong/vanishing candidate delay may be promoted/demoted directly from the start state 172 to the steady state 174/exit state 176.

The above described state machines 170 track the progression of candidate delays over time. Once a candidate delay enters the state machine 170 at the start state 172, the candidate delay passes through multiple intermediate states 178 before reaching the steady state 174. As a result, only well-established candidate delays are typically chosen for RAKE receiver 110. Further, false candidate delays that correspond to surviving delay nodes that represent noise artifacts in the received signal are unlikely to survive in the state machine 170 long enough to be selected by the RAKE processor 150. For example, candidate delays that do not consistently correspond to surviving delay nodes will be regularly demoted, which makes it difficult for the inconsistent candidate delay to make it to the higher states of the state machine 170 and often results in the inconsistent candidate delays being dropped from the state machine 170.

Similarly, delays assigned to RAKE fingers 120 pass through multiple intermediate states before reaching the exit state 176. As a result, assigned RAKE fingers 120 are not automatically reassigned with new delays every time the candidate delay does not correspond to a surviving delay node. The multiple intermediate states 178 reduce the likelihood that a strong candidate delay is dropped by RAKE receiver 110 due to a one or two consecutive weak signal images.

Referring back to FIG. 3, RAKE processor 150 comprises a combining weight generator 152 and finger placement processor 154. The channel coefficients from the channel estimator 140 and the candidate states identified by the path searcher 160 are input to the RAKE processor 150. Combining weight generator 152 determines the combining weights for the weighting elements 132 according to any known method. For example, in conventional RAKE receivers, combining weight generator 152 generates weights based on the channel coefficients of the propagation paths associated with each signal image. In G-RAKE receivers, combining weight generator 152 generates weights based on the channel coefficients and a noise correlation matrix. The techniques for generating combining weights are well-known in the art and are not described in detail herein. In any event, combining weight generator 152 provides the combining weights corresponding to the delays assigned to the RAKE fingers 120.

Finger placement processor 154 selects candidate delays from the pool of candidate delays provided by the path searcher 160. In an exemplary embodiment, finger placement processor 154 ranks the available candidate delays stored within the state machine 170, or output from the tree searcher 168, and assigns each RAKE finger 120 with a candidate delay according to the ranking. In general, the finger placement processor 154 selects candidate delays from the steady state 174 of the state machine 170. Pruning based on signal strength may also be applied, if necessary. However, when the number of candidate delays in the steady state 174 is not enough for all of the RAKE fingers 120, the finger placement processor 154 may select candidate delays from a lower state. In this case, the combining weight generator 152 may generate combining weights that include a scaling factor between 0 and 1 to reduce the impact of candidate delays that have not reached or have been demoted from the steady state 174. For example, using the state machine of FIG. 6A, the combining weight generator 152 may scale the conventional combining weights 152 by a factor of 1 for candidate delays selected from the steady state 174, by a factor of 0.9 when the combining weights correspond to the candidate delays taken from the +2 state, and by a factor of 0.8 when the combining weights correspond to the candidate delays taken from the +1 state. Such factors may also be applied to path strength estimates prior to pruning based on path strengths. In general, RAKE fingers 120 using delays deleted from state machine 170 should be reassigned. However, RAKE fingers 120 may be assigned new delays before the candidate delay is deleted.

Figure 7:
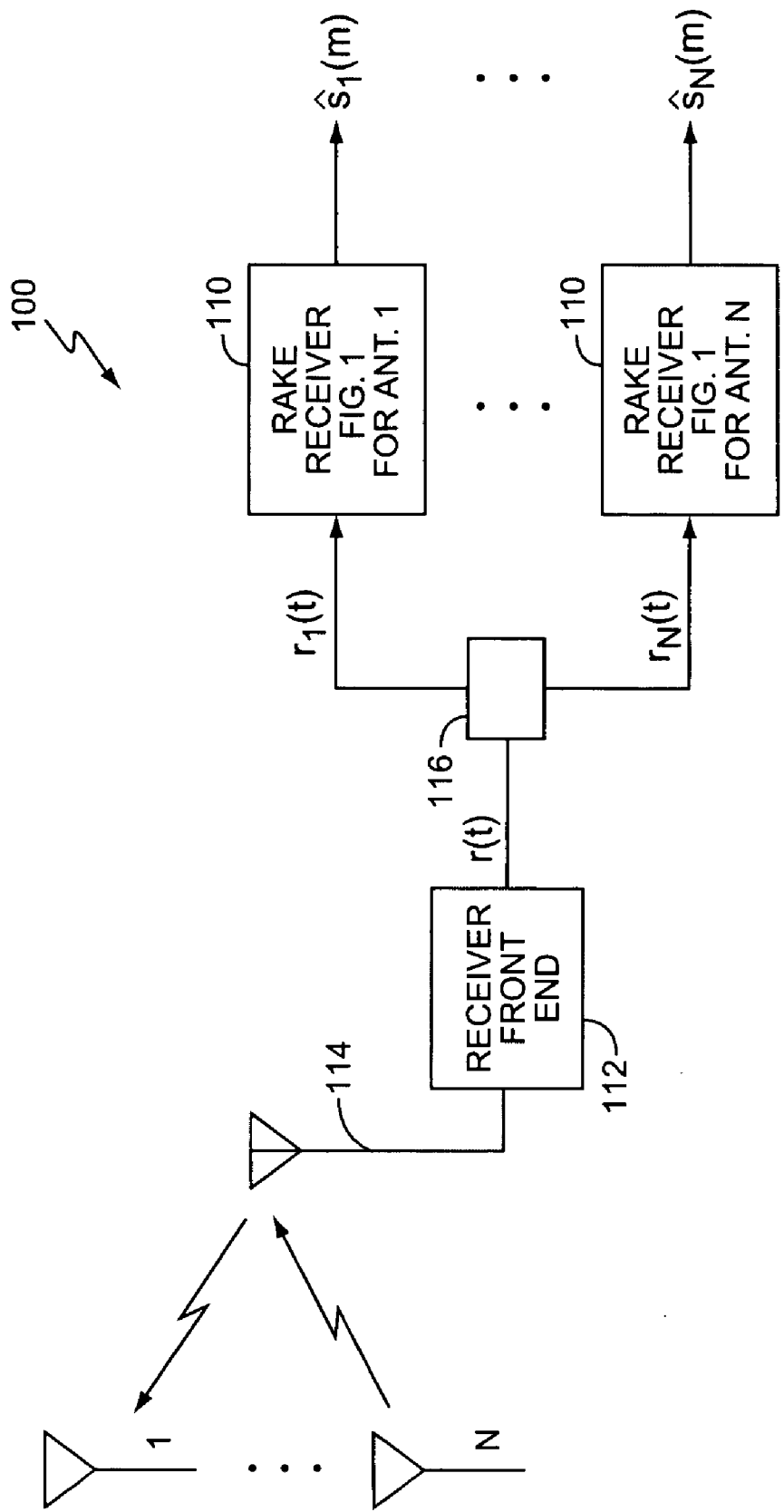
FIG. 7 illustrates a block diagram of an exemplary wireless receiver according to the present invention.

While the above describes the present invention in terms of single receive and transmit antennas, the present invention is also applicable to systems with multiple receive and/or transmit antennas. When used in systems with multiple transmit antennas, each transmit antenna transmits a distinct pilot channel and/or pilot symbols that enables the receiver 100 to distinguish between different channels associated with different transmit antennas. The RAKE receiver 110 of the present invention receives and processes the signals from the multiple transmit antennas by applying the path searching process described above separately to the signals received from each transmit antenna. Thus, if there are two transmit antennas, there may be two separate RAKE receivers 110, one for each transmit antenna, as shown in FIG. 7. A splitter 116 connects the front end 112 to each RAKE receiver 110. The RAKE receivers 110 in this embodiment may be constructed as shown in FIG. 1. Note that in soft handoff, $\hat{s}_1(m)$ through $\hat{s}_N(m)$ may be added when they correspond to the same symbol.

Such an approach makes sense when the transmitting antennas are not co-located. Otherwise, the tree searcher 168 may use a common set of delays for all transmitted signals. One approach would be to search one signal and then use the results for the other signals. Another approach would be to define path energy as the sum of energies from the different transmitted signals.

Figure 8:
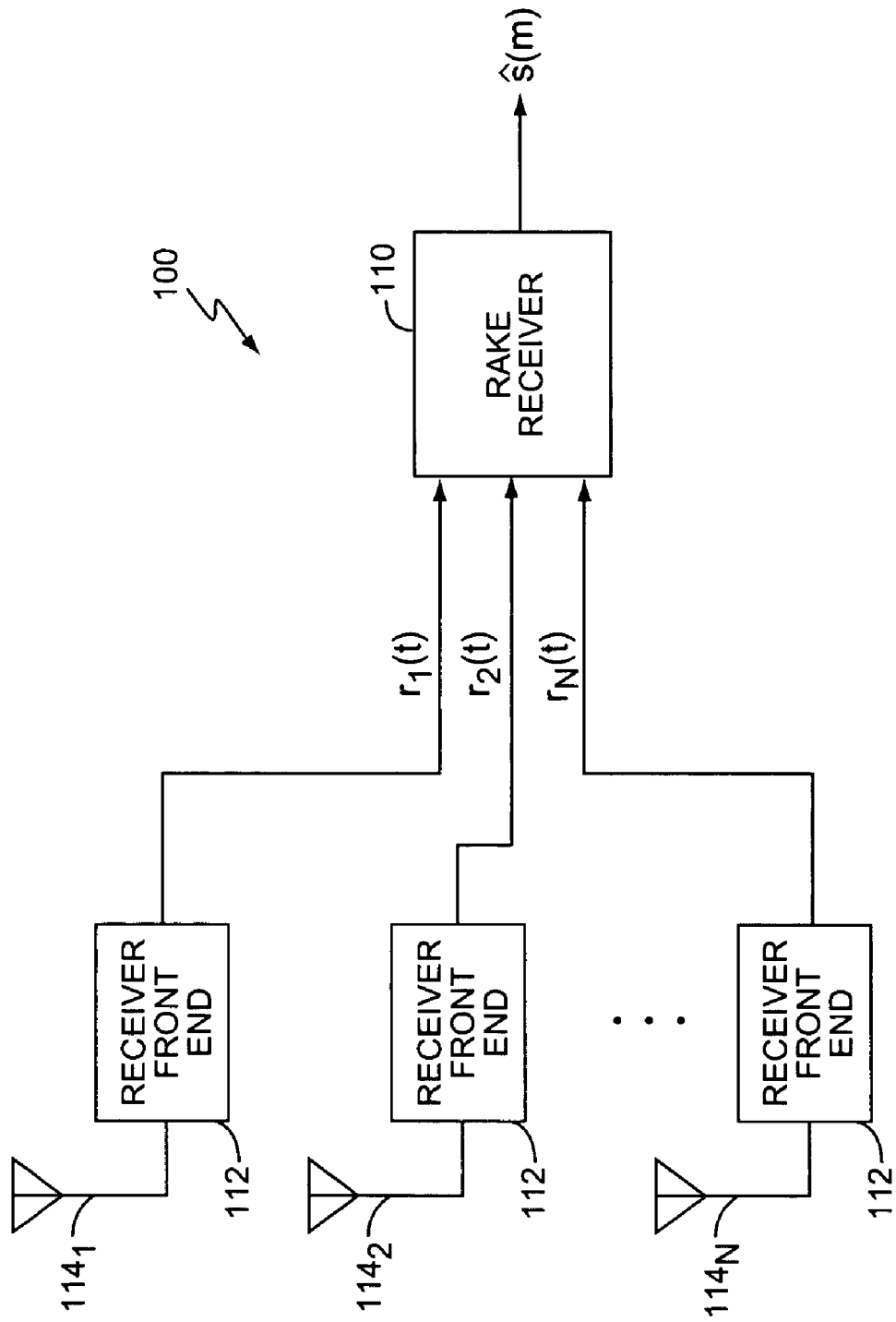
FIG. 8 illustrates a block diagram of another exemplary wireless receiver with multiple receive antennas according to the present invention.
Figure 9:
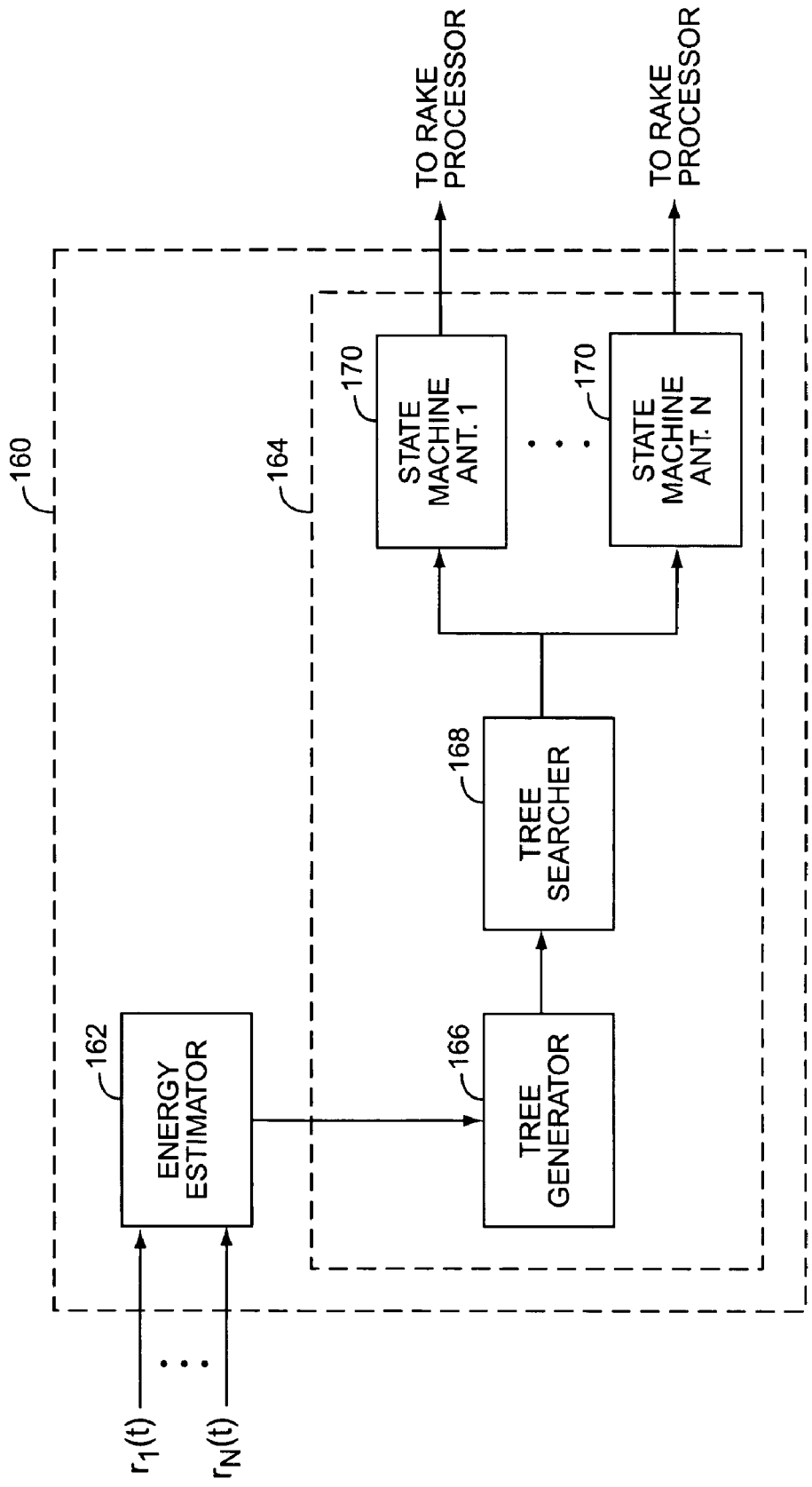
FIG. 9 illustrates an exemplary path searcher for the RAKE receiver of FIG. 8 according to the present invention.
Figure 10:
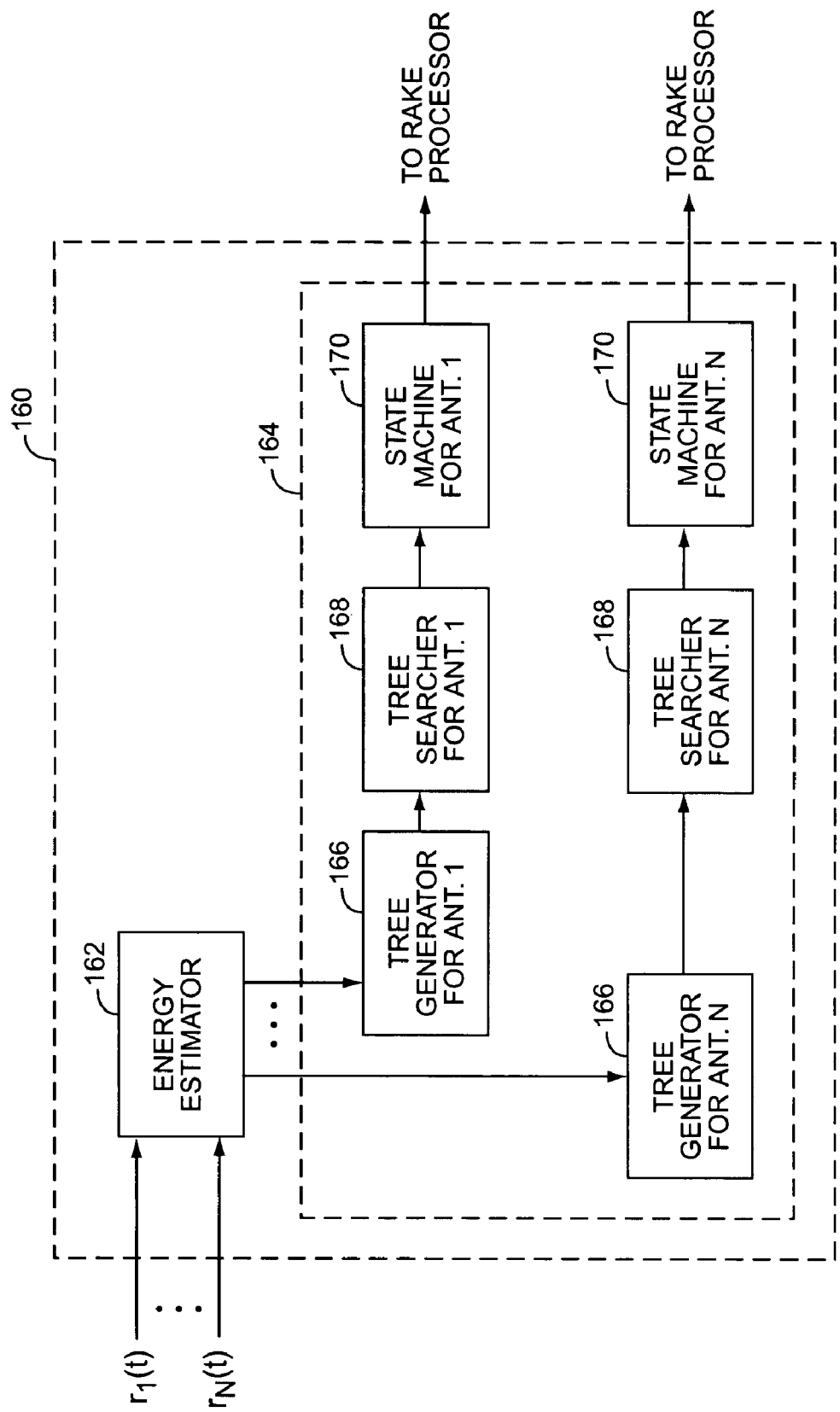
FIG. 10 illustrates another exemplary path searcher for the RAKE receiver of FIG. 8 according to the present invention.
Figure 11:
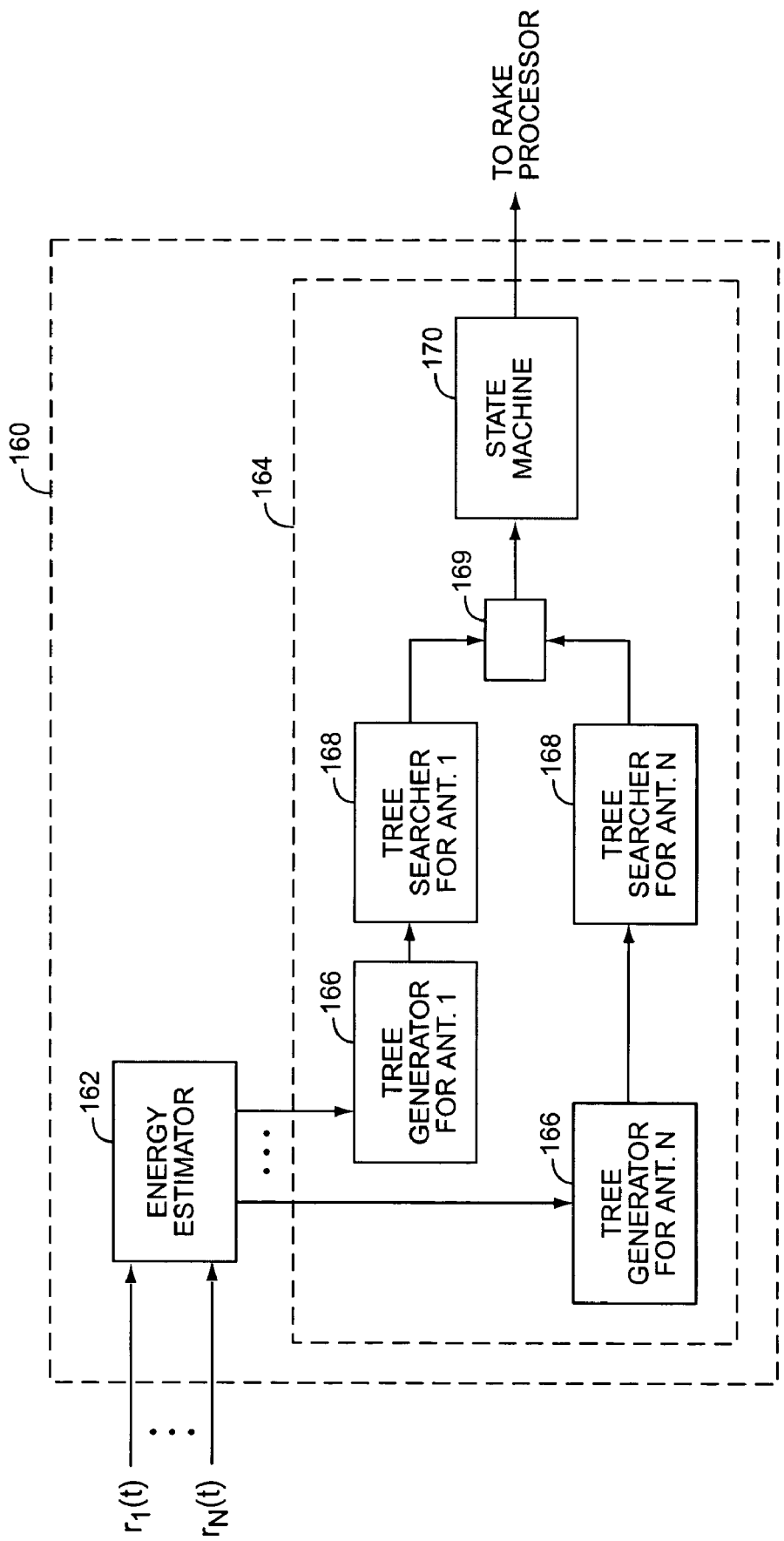
FIG. 11 illustrates another exemplary path searcher for the RAKE receiver of FIG. 8 according to the present invention.

FIG. 8 illustrates a multiple antenna receiver 100. FIGS. 9-11 illustrate path searchers 160 that may be used in the multiple antenna receiver of FIG. 8. In the embodiment shown in FIG. 9, the receiver 100 treats the signals received on multiple antennas 114 as if a single antenna received the signals. If, for example, the system has two receive antennas 114 and front ends 112, receiver 100 may define a search window with twice as many samples and interleave the samples so that the energy levels for the same candidate delay are adjacent. The path searcher 160 may be modified as shown in FIG. 9 to have multiple state machines 170 corresponding to respective antennas 114. Candidate delays identified by the tree searcher 168 are input to the corresponding state machines 170. The RAKE processor 150 selects candidate delays from all of the state machines 170 for assignment to the RAKE fingers 120. The RAKE processor 150 may simply rank all of the candidate delays present in any one of the state machines 170 and select the ten best candidate delays based on path strength. In the case of duplicate delays present in more than one state machine 170, the RAKE processor 150 may use the maximum value, the minimum value, or an average value in the process of ranking the delays.

One way to set up the state machines 170 is to give each surviving delay node a state machine 170. In this case, two state machines 170 may correspond to the same delay but different antennas. Another way to set up state machines 170 is to give each delay a state machine 170. If both antennas have a surviving delay node at that delay, the RAKE processor 150 may use the maximum value, the minimum value, or the sum (average) value in the process of ranking delays.

In the embodiment of FIG. 10, the receiver 100 defines a separate search window and performs a separate delay search for each receive antenna 114. The path searcher 160 comprises a separate tree generator 166, tree searcher 168, and state machine 170 for each antenna 114. The RAKE processor 150 then selects candidate delays from all of the state machines 170 as described above. In the embodiments shown in FIGS. 9 and 10, the RAKE processor may divide the RAKE fingers 120 into groups corresponding to each receive antenna 114, and assign candidate delays from each state machine to a corresponding group of antennas 114.

In the embodiment of FIG. 11, the receiver 100 defines a separate search window and performs a separate tree search for each antenna 114, but combines the results of the searches in a single state machine 170. If the candidate delays identified by the separate tree searchers 168 are combined with an "OR" gate, the state machine 170 promotes a candidate delay each time the candidate delay corresponds to a surviving delay node identified by one of the tree searchers 168. Candidate delays that do not correspond to a surviving delay node in any of the tree searchers 168 are demoted. Alternatively, the candidate delays identified by each tree searcher 168 may be combined with an "AND" gate. In this case, a candidate delay is promoted only when the candidate delay corresponds to a surviving delay node identified by all of the tree searchers 168 and otherwise is demoted.

The present invention may be embodied as cellular communication systems, methods, and/or computer program products. Accordingly, the present invention may be embodied in hardware and/or in software (including firmware, resident software, micro-code, etc.), including an application specific integrated circuit (ASIC). Furthermore, the present invention may take the form of a computer program product on a computer-usable or computer-readable storage medium having computer usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, or a portable compact disc read-only memory (CD-ROM). Note that the computer-usable or computer-readable medium could even be paper or another suitable medium upon which the program is printed, as the program can be electronically captured via, for example, optical scanning of the paper or other medium, then compiled, interpreted, or otherwise processed in a suitable manner, if necessary, and then stored in a computer memory.

The above examples and accompanying figures are intended for illustrative purposes and are not intended to limit the present invention. As such, the present invention may include multiple variations without deviating from the scope of the invention. For example, the energy estimator 162 described above generates a power versus delay profile within a given search window 210 by sampling the PDP over multiple sampling intervals, where the sampling intervals correspond to signal delays, to estimate the received energy levels. However, those skilled in the art will appreciate that energy estimator 162 may estimate other energy parameters, such as the signal-to-noise ratio or the signal-to-interference ratio of the received signal, within the search window (see, for example, commonly assigned U.S. Pat. Ser. No. 60/412,889 filed 23 Sep. 2003). Further, while the above description assumes the energy estimator 162 uses a fixed grid to estimate the energies within the search window 210, it will be understood by those skilled in the art that such fixed grids are not required to implement the present invention; any known method for corresponding received energy levels to delay periods may be used.

In addition, while the delay tree 300 discussed above comprises a balanced binary delay tree 300, those skilled in the art will appreciate that the present invention does not require the binary delay tree 300 to be balanced or binary. Further, while FIG. 4A illustrates a three-level binary delay tree 300, those skilled in the art will appreciate that delay tree 300 is not limited to three levels; tree generator 166 may generate a delay tree 300 with any desired number of levels. In general, the number of samples taken within the search window 210 will define the number of levels of the delay tree 300.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

That which is claimed:

1. A search method for identifying one or more candidate delays for a receiver comprising:

receiving a signal having one or more signal images, each signal image having a corresponding signal delay;

generating a hierarchical delay tree for the received signal comprising a plurality of delay nodes in a lowermost level of the delay tree linked by branches and one or more linking nodes to a root node at the highest level of the delay tree, wherein each delay node is associated with one of the signal delays;

searching through the delay tree to identify one or more surviving delay nodes, wherein searching comprises traversing downward through the delay tree and identifying one or more surviving nodes at each level during said downward traversal by comparing a value associated with each node traversed with a predetermined threshold; and selecting one or more surviving delay nodes as the candidate delays.

2. The search method of claim 1 further comprising:
identifying non-surviving nodes at each level of the delay tree below the root node; and
deleting subtrees depending from the non-surviving nodes such that the subsequent searches through the lower levels of the delay tree do not include the deleted subtrees.

3. The search method of claim 1 wherein the predetermined threshold comprises a level-specific threshold for each level of the delay tree.

4. The method of claim 1 wherein searching through the delay tree to identify one or more surviving delay nodes further comprises repetitively searching through the delay tree until a desired number of candidates delays are identified.

5. The method if claim 4 wherein repetitively searching through the delay tree until a desired number of candidates delays are identified further comprises increasing the predetermined threshold in a repeat search relative to an initial search to reduce the number of candidate delays identified.

6. The method of claim 5 wherein repetitively searching through the delay tree until a desired number of candidates delays are identified further comprises limiting the repeat search to subtrees depending from surviving nodes in the previous search.

7. The method of claim 4 wherein repetitively searching through the delay tree until a desired number of candidates delays are identified further comprises decreasing the predetermined threshold in a repeat search relative to an initial search to increase the number of candidate delays identified.

8. The method of claim 7 wherein repetitively searching through the delay tree until a desired number of candidates delays are identified further comprises limiting the repeat search to subtrees depending from non-surviving nodes in the previous search.

9. The search method of claim 1 further comprising inputting the candidate delays corresponding to the surviving delay nodes into a state machine, said state machine comprising a plurality of ordered states including a start state, a steady state, and an exit state.

10. The search method of claim 9 further comprising assigning one or more candidate delays in one or more states of the state machine to a demodulator.

11. The search method of claim 9 further comprising promoting and demoting candidate delays present in the state machine responsive to the results of searching through the delay tree.

12. The search method of claim 11 wherein promoting and demoting candidate delays present in the state machine responsive to the results of searching through the delay tree comprises promoting candidate delays present in the state machine from a first state to a second state when the candidate delay corresponds to a surviving delay node.

13. The search method of claim 11 wherein promoting and demoting candidate delays present in the state machine responsive to the results of searching through the delay tree comprises demoting candidate delays present in the state machine from a first state to a second state when the candidate delay corresponds to a non-surviving delay node.

14. The search method of claim 9 further comprising deleting one or more candidate from the exit state of the state machine responsive to the results of searching through the delay tree.

15. The search method of claim 1 wherein generating a hierarchical delay tree comprises:
determining a signal characteristic for one or more signal delays;
assigning a value based on the signal characteristics to the delay nodes;
assigning a value to each linking node equal to the sum of the nodes in the next lower level connected by branches to the linking node; and
assigning a value to the root node equal to the sum of the linking nodes at the level below the root node connected by branches to the root node.

16. The search method of claim 15 wherein determining the signal characteristic for the one or more signal delays comprises determining a signal energy associated with each of the one or more signal delays.

17. The search method of claim 15 wherein determining the signal characteristic for the one or more signal delays comprises determining a signal-to-noise ratio associated with each of the one or more signal delays.

18. The search method of claim 1 wherein generating a hierarchical delay tree comprises generating a binary delay tree.

19. The search method of claim 18 wherein generating a binary delay tree comprises generating a balanced binary delay tree.

20. The search method of claim 1 wherein receiving a signal having one or more signal images comprises receiving a first signal transmitted from a first antenna, said first signal having one or more signal images.

21. The search method of claim 20 further comprising:
receiving a second signal transmitted from a second antenna, said second signal having one or more signal images;
generating a second hierarchical delay tree for the second signal;
searching through both delay trees to identify a set of surviving delay nodes associated with the first and second signals; and
selecting one or more surviving delay nodes from the set of surviving delay nodes as the candidate delays associated with the first and second signals.

22. The search method of claim 1 wherein receiving a signal having one or more signal images comprises receiving the signal at first and second receive antennas.

23. The search method of claim 22 further comprising combining signal characteristics measured at the first and second receive antennas into a composite characteristic, wherein generating a hierarchical delay tree comprises generating a hierarchical delay tree for the composite characteristic.

24. The search method of claim 22 wherein generating the hierarchical delay tree comprises generating a first hierarchical delay tree for the signal delays associated with the first receive antenna and generating a second hierarchical delay tree for the signal delays associated with the second receive antenna.

25. The search method of claim 24 wherein searching through the delay tree comprises searching through the first delay tree to identify one or more surviving delay nodes associated with the first receive antenna and searching through the second delay tree to identify one or more surviving delay nodes associated with the second receive antenna.

26. The search method of claim 1 wherein the receiver is a RAKE receiver.

27. A method for selecting one or more finger delays for a RAKE receiver comprising:
receiving a signal having one or more signal images, each signal image having a corresponding signal delay;
generating a hierarchical delay tree comprising a plurality of delay nodes in a lowermost level of the delay tree linked by branches and one or more linking nodes to a root node at the highest level of the delay tree, wherein each delay node is associated with a signal delay;

searching through the delay tree to identify one or more surviving delay nodes, wherein searching comprises traversing downward through the delay tree and identifying one or more surviving nodes at each level during said downward traversal by comparing a value associated with each node traversed with a predetermined threshold;

adding candidate delays corresponding to the surviving delay nodes to a candidate pool; and selecting one or more finger delays for the RAKE receiver from the candidate pool.

28. The method of claim 27 wherein generating a hierarchical delay tree comprises:

determining a signal characteristic for one or more signal delays;

assigning a value based on the signal characteristics to the delay nodes;

assigning a value to each linking node equal to the sum of the nodes in the next lower level connected by branches to the linking node; and assigning a value to the root node equal to the sum of the linking nodes at the level below the root node connected by branches to the root node.

29. The method of claim 28 wherein determining the signal characteristic for one or more signal delays comprises determining a signal energy associated with the one or more signal delays.

30. The method of claim 28 wherein determining the signal characteristics for one or more signal delays comprises determining a signal-to-noise ratio associated with the one or more signal delays.

31. The method of claim 27 wherein the predetermined threshold comprises a level-specific threshold for each level of the delay tree.

32. The method of claim 27 further comprising:

identifying non-surviving nodes at each level of the delay tree; and deleting subtrees depending from the non-surviving nodes such that the subsequent searches through the lower levels of the delay tree do not include the deleted subtrees.

33. The method of claim 27 wherein searching through the delay tree to identify one or more surviving delay nodes further comprises repetitively searching through the delay tree until a desired number of candidates delays are identified.

34. The method of claim 33 wherein repetitively searching through the delay tree until a desired number of candidates delays are identified further comprises increasing the predetermined threshold in a repeat search relative to an initial search to reduce the number of candidate delays identified.

35. The method of claim 34 wherein repetitively searching through the delay tree until a desired number of candidates delays are identified further comprises limiting the repeat search to subtrees depending from surviving nodes in the previous search.

36. The method of claim 33 wherein repetitively searching through the delay tree until a desired number of candidates delays are identified further comprises decreasing the predetermined threshold in a repeat search relative to an initial search to increase the number of candidate delays identified.

37. The method of claim 36 wherein repetitively searching through the delay tree until a desired number of candidates delays are identified further comprises limiting the repeat search to subtrees depending from non-surviving nodes in the previous search.

38. The method of claim 27 wherein adding the candidate delays corresponding to the surviving delay nodes to the candidate pool comprises inputting the candidate delays corresponding to the surviving delay nodes into a state machine, said state machine comprising a plurality of ordered states including a start state, a steady state, and an exit state.

39. The method of claim 38 further comprising assigning one or more candidate delays in one or more states of the state machine to respective RAKE fingers.

40. The method of claim 39 wherein assigning one or more candidate delays in one or more states of the state machine to respective RAKE fingers comprises assigning one or more candidate delays in the steady state to respective RAKE fingers.

41. The method of claim 38 further comprising promoting and demoting candidate delays present in the state machine responsive to the results of searching through the delay tree.

42. The method of claim 41 wherein promoting and demoting candidate delays present in the state machine responsive to the results of searching through the delay tree comprises promoting candidate delays in the state machine from a first state to a second state when the candidate delay corresponds to a surviving delay node.

43. The method of claim 41 wherein promoting and demoting candidate delays present in the state machine responsive to the results of searching through the delay tree comprises demoting candidate delays present in the state machine from a first state to a second state when the candidate delay corresponds to a non-surviving delay node.

44. The method of claim 38 further comprising deleting one or more candidate from the state machine responsive to the results of searching through the delay tree.

45. A delay searcher for a receiver to search a received signal having a plurality of signal images corresponding to a plurality of signal delays for one or more candidate delays, the delay searcher comprising:

a tree generator to generate a hierarchical delay tree comprising:

a plurality of delay nodes in a lowermost level of the delay tree, wherein each delay node is associated with a signal delay;

a root node at the highest level of the delay tree;

one or more linking nodes disposed between the root node and the plurality of delay nodes; and branches that link the plurality of delay nodes to the root node via the linking nodes; and a tree searcher to search through the delay tree to identify one or more surviving delay nodes, wherein the one or more surviving delay nodes correspond to the one or more candidate delays, and wherein the tree searcher traverses downward through the delay tree to identify one or more surviving nodes at each level during said downward traversal by comparing a value associated with each node traversed with a predetermined threshold.

46. The delay searcher of claim 45 wherein the tree generator determines the predetermined threshold by determining a level threshold for each level of the delay tree.

47. The delay searcher of claim 46 wherein the tree searcher searches through the delay tree by comparing the nodes at one or more levels to the corresponding level threshold and identifying the nodes that meet or exceed the level threshold as the surviving nodes.

48. The delay searcher of claim 47 wherein the tree searcher further identifies non-surviving nodes at each level of the delay tree and deletes subtrees depending from the non-surviving delay nodes such that subsequent searches through the lower levels of the delay tree do not include the deleted subtrees.

49. The delay searcher of claim 46 wherein the tree searcher repeatedly searches through the delay tree until a desired number of candidate delays are identified.

50. The delay searcher of claim 49 wherein the tree searcher increases the level thresholds in a repeat search relative to an initial search to reduce the number of candidate delays identified.

51. The delay searcher of claim 50 wherein the tree searcher limits the repeat search to subtrees depending from surviving nodes in the previous search.

52. The delay searcher of claim 49 wherein the tree searcher decreases the level thresholds in a repeat search relative to an initial search to increase the number of candidate delays identified.

53. The delay searcher of claim 52 wherein the tree searcher limits the repeat search to subtrees depending from non-surviving nodes in the previous search.

54. The delay searcher of claim 45 further comprising a state machine comprising a plurality of ordered states including a start state, an exit state, and a steady state.

55. The delay searcher of claim 54 wherein the state machine promotes and demotes candidate delays present in the state machine responsive to the results from the tree searcher.

56. The delay searcher of claim 55 wherein the state machine promotes candidate delays in the state machine from a first state to a second state when the candidate delay corresponds to a surviving delay node.

57. The delay searcher of claim 55 wherein the state machine demotes candidate delays in the state machine from a first state to a second state when the candidate delay corresponds to a non-surviving delay node.

58. The delay searcher of claim 54 wherein the state machine deletes one or more candidate delays from the exit state responsive to the results from the tree searcher.

59. The delay searcher of claim 45 wherein the tree generator assigns a value to each linking node equal to the sum of the nodes in the next lower level connected by branches to the linking node, and wherein the tree generator assigns a value to the root node equal to the sum of the linking nodes at the level below the root node connected by branches to the root node.

60. The delay searcher of claim 45 wherein the received signal comprises a signal received at first and second receive antennas.

61. The delay searcher of claim 60 further comprising first and second state machines comprising a plurality of ordered states including a start state, an exit state, and a steady state, wherein the first state machine receives the candidate delays associated with the first receive antenna and wherein the second state machine receives the candidate delays associated with the second receive antenna.

62. The delay searcher of claim 60 wherein the tree generator generates the hierarchical delay tree for the signal delays associated with the first receive antenna and wherein the tree searcher identifies one or more surviving delay nodes corresponding to the one or more candidate delays associated with the first receive antenna, the delay searcher further comprising:
   a second tree generator to generate a second hierarchical delay tree for the signal delays associated with the second receive antenna; and
   a second tree searcher to search through the second delay tree to identify one or more surviving delay nodes, wherein the one or more surviving delay nodes correspond to one or more candidate delays associated with the second receive antenna.

63. The delay searcher of claim 62 further comprising first and second state machines comprising a plurality of ordered states including a start state, an exit state, and a steady state, wherein the first state machine receives the candidate delays associated with the first receive antenna and wherein the second state machine receives the candidate delays associated with the second receive antenna.

64. The delay searcher of claim 62 further comprising:
   a combiner to combine the candidate delays associated with the first and second receive antennas into a composite set of candidate delays; and
   a state machine comprising a plurality of ordered states including a start state, an exit state, and a steady state, to receive the composite set of candidate delays.

65. The delay searcher of claim 64 wherein the combiner comprises an OR-gate.

66. The delay searcher of claim 64 wherein the combiner comprises an AND-gate.

67. A RAKE receiver in a wireless network comprising:
   a front end receiver for receiving a signal having one or more signal images, each signal image having a corresponding signal delay;
   a delay searcher to generate and search through a hierarchical delay tree based on delay nodes associated with the signal delays to identify one or more surviving delay nodes, wherein each surviving delay node corresponds to a candidate delay, and wherein the tree searcher traverses downward through the delay tree to identify the one or more surviving nodes at each level during said downward traversal by comparing a value associated with each node traversed with a predetermined threshold; and
   wherein the RAKE receiver selects one or more RAKE finger delays from the candidate delays.

68. The RAKE receiver of claim 67 wherein the delay searcher comprises a tree generator to generate the hierarchical delay tree, said hierarchical delay tree comprising:
   a plurality of delay nodes in a lowermost level of the delay tree, wherein each delay node is associated with a signal delay;
   a root node at the highest level of the delay tree;
   one or more linking nodes disposed between the root node and the plurality of delay nodes; and
   branches that link the plurality of delay nodes to the root node via the linking nodes.

69. The RAKE receiver of claim 68 further comprising an energy estimator to determine a signal characteristic for one or more signal delays, wherein the tree generator assigns a value based on the signal characteristics to each delay node.

70. The RAKE receiver of claim 69 wherein the signal characteristic comprises a signal energy associated with the signal delay.

71. The RAKE receiver of claim 68 wherein tree generator assigns a value to each linking node equal to the sum of the nodes in the next lower level connected by branches to the linking node, and wherein the tree generator assigns a value to the root node equal to the sum of the linking nodes at the level below the root node connected by branches to the root node.

72. The RAKE receiver of claim 67 wherein the delay searcher determines the predetermined threshold by determining a level threshold for each level of the delay tree.

73. The RAKE receiver of claim 72 wherein the tree searcher identifies the nodes that meet or exceed the level threshold as the surviving nodes.

74. The RAKE receiver of claim 73 wherein the tree searcher further identifies non-surviving nodes at each level of the delay tree and deletes subtrees depending from the non-surviving delay nodes such that subsequent searches through the lower levels of the delay tree do not include the deleted subtrees.

75. The RAKE receiver of claim 72 wherein the tree searcher repeatedly searches through the delay tree until a desired number of candidate delays are identified.

76. The RAKE receiver of claim 75 wherein the tree searcher changes the level thresholds in a repeat search to identify a fewer or greater number of candidate delays.

77. The RAKE receiver of claim 76 wherein the tree searcher increases the level thresholds in the repeat search relative to an initial search to reduce the number of candidate delays identified.

78. The RAKE receiver of claim 77 wherein the tree searcher limits the repeat search to subtrees depending from surviving nodes in the previous search.

79. The RAKE receiver of claim 76 wherein the tree searcher decreases the level thresholds in the repeat search relative to an initial search to increase the number of candidate delays identified.

80. The RAKE receiver of claim 79 wherein the tree searcher limits the repeat search to subtrees depending from non-surviving nodes in the previous search.

81. The RAKE receiver of claim 67 further comprising a state machine comprising a plurality of ordered states including a start state, an exit state, and a steady state, wherein said state machine receives the candidate delays corresponding to the surviving delay nodes.

82. The RAKE receiver of claim 81 wherein the state machine promotes and demotes candidate delays present in the state machine responsive to the results from the delay searcher.

83. The RAKE receiver of claim 82 wherein the state machine promotes candidate delays in the state machine from a first state to a second state when the candidate delay corresponds to a surviving delay node.

84. The RAKE receiver of claim 82 wherein the state machine demotes candidate delays in the state machine from a first state to a second state when the candidate delay corresponds to a non-surviving delay node.

85. The RAKE receiver of claim 81 wherein the state machine deletes one or more candidate delays responsive to the results from the tree searcher.

86. The RAKE receiver of claim 67 wherein the front-end receiver receives a first signal transmitted from a first antenna, said first signal having one or more signal images.

87. The RAKE receiver of claim 86 wherein the front-end receiver receives a second signal transmitted from a second antenna, said second signal having one or more signal images, and wherein the delay searcher generates a second hierarchical delay tree based on delay nodes associated with the signal delays of the second signal.

88. The RAKE receiver of claim 87 wherein the delay searcher searches through both delay trees to identify a set of surviving delay nodes associated with the first and second signals and selects one or more surviving delay nodes from the set of surviving delay nodes as the candidate delays associated with the first and second signals.

89. The RAKE receiver of claim 67 wherein the front-end receiver receives the signal at first and second receive antennas.

90. The RAKE receiver of claim 89 further comprising a combiner to combine signal characteristics received at the first and second receive antennas into a composite characteristic, wherein the delay searcher generates a hierarchical delay tree for the composite characteristic.

91. The RAKE receiver of claim 89 further comprising first and second state machines comprising a plurality of ordered states including a start state, an exit state, and a steady state, wherein the first state machine receives the candidate delays associated with the first receive antenna and wherein the second state machine receives the candidate delays associated with the second receive antenna.

92. The RAKE receiver of claim 89 wherein the delay searcher further comprises:
a first tree generator to generate a first hierarchical delay tree for the signal delays associated with the first receive antenna;
a first tree searcher to search through the first delay tree and identify one or more surviving delay nodes associated with the first receive antenna;
a second tree generator to generate a second hierarchical delay tree for the signal delays associated with the second receive antenna; and
a second tree searcher to search through the second delay tree to identify one or more surviving delay nodes associated with the second receive antenna.

93. The RAKE receiver of claim 92 further comprising first and second state machines comprising a plurality of ordered states including a start state, an exit state, and a steady state, wherein the first state machine receives the candidate delays associated with the first receive antenna and wherein the second state machine receives the candidate delays associated with the second receive antenna.

94. The RAKE receiver of claim 92 further comprising:
a combiner to combine the candidate delays associated with the first and second receive antennas into a composite set of candidate delays; and
a state machine comprising a plurality of ordered states including a start state, an exit state, and a steady state, to receive the composite set of candidate delays.

95. The RAKE receiver of claim 94 wherein the combiner comprises an OR-gate.

96. The RAKE receiver of claim 94 wherein the combiner comprises an AND-gate.

97. A circuit for processing a received signal having one or more signal images, each signal image having a corresponding signal delay, the circuit comprising search circuitry to generate and search through a hierarchical delay tree based on delay nodes associated with the signal delays to identify one or more surviving delay nodes, wherein each surviving delay node corresponds to a candidate delay, and wherein the search circuitry traverses downward through the hierarchical delay tree to identify one or more surviving nodes at each level during said downward traversal by comparing a value associated with each node traversed with a predetermined threshold.

98. The circuit of claim 97 wherein the search circuitry includes tree generation circuitry to generate the hierarchical delay tree, said hierarchical delay tree comprising:
a plurality of delay nodes in a lowermost level of the delay tree, wherein each delay node is associated with a signal delay;
a root node at the highest level of the delay tree;
one or more linking nodes disposed between the root node and the plurality of delay nodes; and
branches that link the plurality of delay nodes to the root node via the linking nodes.

99. The circuit of claim 97 wherein the search circuitry determines the predetermined threshold by determining a level threshold for each level of the delay tree.

100. The circuit of claim 99 wherein the search circuitry identifies the nodes that meet or exceed the level threshold as the surviving nodes.

101. The circuit of claim 100 wherein the search circuitry further identifies non-surviving nodes at each level of the delay tree and deletes subtrees depending from the non-surviving delay nodes such that subsequent searches through the lower levels of the delay tree do not include the deleted subtrees.

102. The circuit of claim 97 wherein the search circuitry repeatedly searches through the delay tree until a desired number of candidate delays are identified.

* * * * *